United States Patent
Noda et al.

(10) Patent No.: US 8,532,196 B2
(45) Date of Patent: Sep. 10, 2013

(54) DECODING DEVICE, RECORDING MEDIUM, AND DECODING METHOD FOR CODED DATA

(75) Inventors: Kazushige Noda, Ome (JP); Satoshi Koda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 443 days.

(21) Appl. No.: 12/883,816

(22) Filed: Sep. 16, 2010

(65) Prior Publication Data

US 2011/0072439 A1 Mar. 24, 2011

(30) Foreign Application Priority Data

Sep. 18, 2009 (JP) ................................ 2009-217889

(51) Int. Cl.
*H04N 7/12* (2006.01)

(52) U.S. Cl.
USPC .................................................... 375/240.25

(58) Field of Classification Search
USPC ........................................ 375/240.01, 240.11
See application file for complete search history.

(56) References Cited

U.S. PATENT DOCUMENTS

| | | | | |
|---|---|---|---|---|
| 5,699,117 A | * | 12/1997 | Uramoto et al. | ........... 348/390.1 |
| 2006/0093042 A1 | | 5/2006 | Kashima et al. | |
| 2006/0093043 A1 | | 5/2006 | Kashima et al. | |
| 2006/0193383 A1 | * | 8/2006 | Alvarez et al. | ........... 375/240.03 |
| 2007/0189735 A1 | * | 8/2007 | Kawashima et al. | ......... 386/112 |
| 2009/0220008 A1 | * | 9/2009 | Park et al. | ................ 375/240.24 |
| 2010/0021142 A1 | * | 1/2010 | Minami et al. | ................ 386/109 |

FOREIGN PATENT DOCUMENTS

| | | |
|---|---|---|
| JP | 2005-341567 | 12/2005 |
| JP | 2006-129284 | 5/2006 |
| JP | 2006-129285 | 5/2006 |
| WO | WO 2008/114367 A1 | 9/2008 |

OTHER PUBLICATIONS

Office Action for Japanese Patent Application No. 2009-217889, mailed Jun. 5, 2012, 2 pgs.

* cited by examiner

*Primary Examiner* — David Czekaj
*Assistant Examiner* — Tracy Li
(74) *Attorney, Agent, or Firm* — Sprinle IP Law Group (57) ABSTRACT

According to one embodiment, a decoding device includes a storage section, a control section, a decoding processing section. The storage section stores control information showing a progress state of process stages for a decoding process as to a plurality of processing data included in coded data. The control section allocates process stages corresponding to executable processing data which is executable in parallel, to a processor on the basis of the control information, a dependence relation between the processing data in the decoding process, and a dependence relation between the process stages. The decoding processing section parallelly executes allocated process stages corresponding to the executable processing data.

9 Claims, 7 Drawing Sheets

DECODING DEVICE, RECORDING MEDIUM, AND DECODING METHOD FOR CODED DATA

CROSS-REFERENCE TO RELATED APPLICATIONS

This application is based upon and claims the benefit of priority from Japanese Patent Application No. 2009-217889, filed Sep. 18, 2009; the entire contents of which are incorporated herein by reference.

FIELD

Embodiments described herein relate generally to a decoding device for coded data, a recording medium, and a decoding method.

BACKGROUND

In a decoding process for coded moving image data, it is desired to use computer sources efficiently by executing the decoding process in parallel.

Although moving image compression technologies, for example, an H.264 standard and the like are excellent in compression efficiency, they have a large amount of load to be processed. An H.264 moving image compression tool has a dependence relation between processes based on a characteristic of the moving image compression technology. Accordingly, in general, it is difficult to execute the decoding process of H.264 coded moving image data on a computer including plural core processors.

DETAILED DESCRIPTION

In general, according to embodiments, a decoding device includes a storage section, a control section, and a decoding processing section. The storage section stores control information showing a progress state of process stages for a decoding process as to a plurality of processing data included in coded data. The control section allocates process stages corresponding to executable processing data which is executable in parallel, to at least one processor on the basis of the control information, a dependence relation between the processing data in the decoding process, and a dependence relation between the process stages. The decoding processing section parallelly executes allocated process stages corresponding to the executable processing data.

Embodiments will be explained below with reference to accompanying drawings. In the drawings, the same reference numbers and symbols denote the same or substantially same elements, and a description thereof will be omitted or briefly described. Only different parts will be explained in detail.

First Embodiment

In a first embodiment, a parallel decoding device for decoding (expanding) coded (compressed) moving image data, which is based on, for example, an H.264 standard, in parallel will be explained. Note that even if the parallel decoding device is based on a standard other than the H.264 standard, the device can execute decoding in parallel by applying a process based on a similar view point.

In the present embodiment, the parallel decoding device includes plural processors and executes a decoding process to H.264 coded data. The decoding process is divided into plural stages. A stage controller of the parallel decoding device allocates stages which can be executed to processors which are capable of executing the stages. The stage controller can allocate each of the stages to a single processor or to plural processors. The plural stages store process results in the respective stages. The stage controller selects stages which can be executed based on a dependence relation between the respective stages and on a progress state of the decoding process, and determines executable data for the stages which can be executed.

Figure 1:
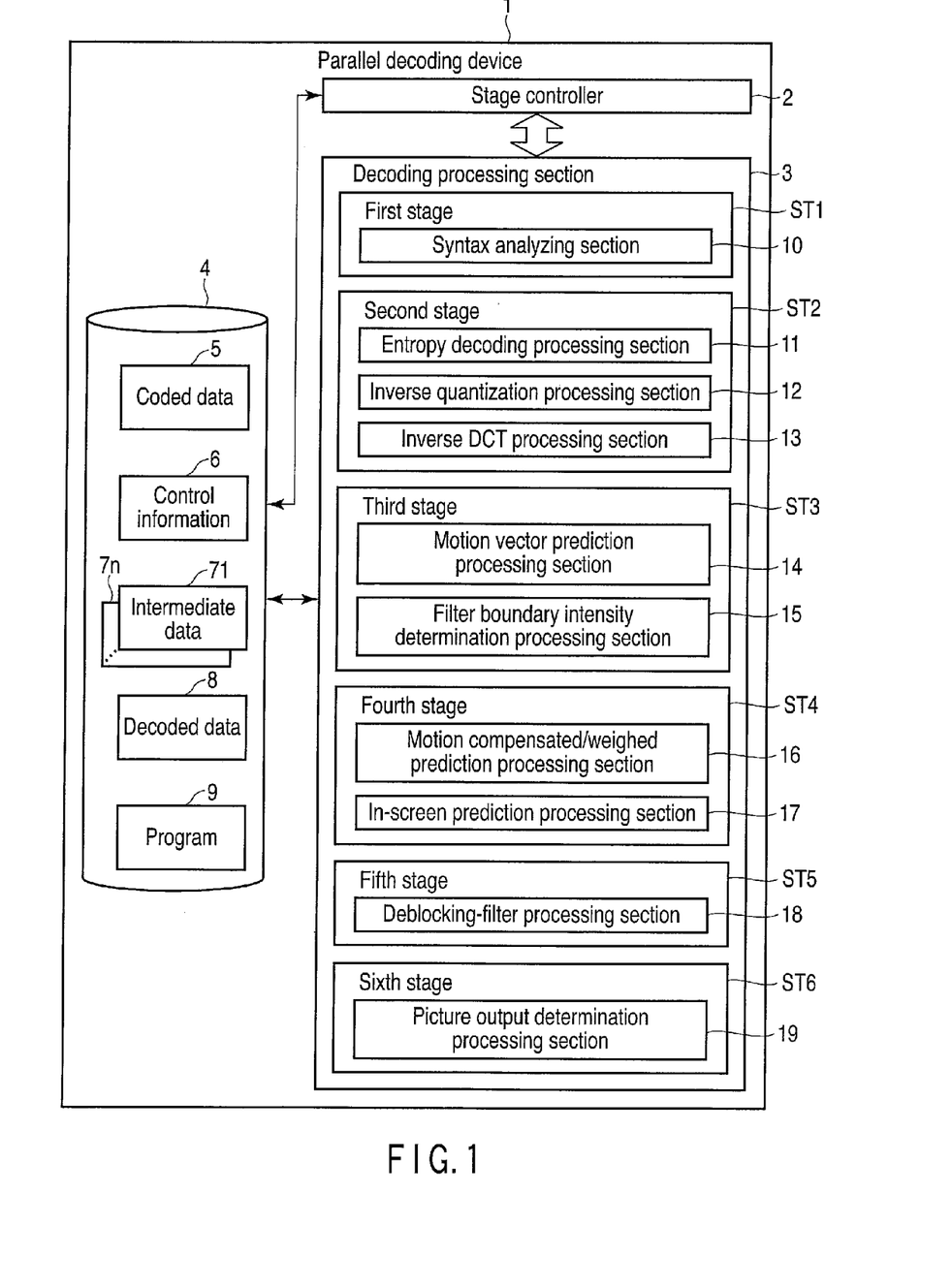
FIG. 1 is a block diagram showing an example of a parallel decoding device according to a first embodiment.

FIG. 1 is a block diagram showing an example of the parallel decoding device according to the present embodiment.

The parallel decoding device 1 according to the present embodiment includes the stage controller 2, a decoding processing section 3, and a storage device 4.

The storage section 4 stores coded data 5, control information 6, intermediate data 71-7*n*, decoded data 8, and a program 9. The storage device 4 includes, for example, a main memory, a local storage, and the like. Note that the program 9 may be composed of plural programs. The program 9, which functions as the stage controller 2 and as the decoding processing section 3, need not be one program as a configuration. The program 9 may be separated into units for controlling a stage or units for processing respective stages. In that case, since the size of a program loaded on local storages provided with the processors becomes compact, efficiency in resources usage can be improved.

The coded data 5 is moving image data coded based on, for example, the H.264 standard. Note that the coded data 5 may not be data stored in the storage device 4 or may be data input from an input device.

The control information 6 includes information and the like showing progress states of each of processes of frames, slices, and macroblocks included in the coded data 5, and is used to a control executed by the stage controller 2. The control information 6 may be updated by the stage controller 2 or may be updated by respective stages ST1-ST6.

The intermediate data 71-7*n* are various types of data created by a decoding process executed by the decoding processing section 3.

The decoded data 8 is decoded moving image data which is created by the decoding processing section 3. Note that the decoded data 8 may be output from an output device without being stored in the storage device 4.

The program 9 is loaded on the local storages disposed to the plural processors (core processors) and executed on the processors. As a result, the function of the parallel decoding device 1 as the stage controller 2 and as the decoding processing section 3 is realized.

The parallel decoding device 1 decodes the coded data 5 in parallel.

The parallel decoding device 1 comprises the decoding processing section 3 which corresponds to a tool for decoding the coded data 5 according to the H.264 standard, and the stage controller 2 for controlling the decoding processing section 3.

The parallel decoding device 1 executes the decoding process in parallel by selecting processes and data which can be executed based on the control information 6, on the dependence relation between plural processes included in the decoding processing section 3, and on the dependence relation between plural data included in the coded data 5. Note that when a second process is executed based on a result of a first process and a result of the second process is affected by a result of the first process, it is assumed that the second process depends on the first process. Further, when a process to second data is executed based on a result of a process to first data and a result of the process to the second data is affected by a result of the process to the first data, it is assumed that the second data depends on the first data.

The stage controller 2 allocates the stages ST1-ST6 to the single processor or to the plural processors. The stage controller 2 can allocate one or plural stages to the single processor or to the plural processors. The plural stages ST1-ST6 hold plural process results in the respective stages.

The stage controller 2 selects stages which can be executed, selects data which can be executed as to the stages which can be executed, and requests the processors which can execute the stages which can be executed to execute the stages which can be executed, based on the dependence relation between the stages ST1-ST6 and on the progress states of processes shown by the control information 6.

The decoding processing section 3 executes processes by dividing the decoding process according to the H.264 standard to the first stage ST1, the second stage ST2, the third stage ST3, the fourth stage ST4, the fifth stage ST5, and the sixth stage ST6. Note that the decoding processing section 3 can appropriately change a method of dividing the decoding process and the number of stages to divide into. The decoding processing section 3 can also appropriately change processing sections included in the respective stages. A division of the stages and an allocation of the processing sections included in the stages of the decoding processing section 3 in FIG. 1 are examples and can be changed based on the feature of an architecture or on a chip configuration.

The first stage ST1 includes a syntax analyzing section 10.

The syntax analyzing section 10 executes an analysis process of a non-VCL NAL unit and an analysis process of a slice header of a VCL NAL unit.

The second stage ST2 includes an entropy decoding processing section 11, an inverse quantization processing section 12, and an inverse DCT (Discrete Cosine Transform) processing section 13.

The entropy decoding processing section 11 executes a CABAC (Context-based Adaptive Binary Arithmetic Code) decoding process or a CAVCL (Context-based Adaptive Variable Length Code) decoding process of slice data as an entropy decoding process after the analysis process of the slice header of the VCL NAL unit in a unit of macroblock.

The inverse quantization processing section 12 executes an inverted quantization process based on a coefficient determined by a process result of the entropy decoding processing section 11.

The inverse DCT processing section 13 executes an inverted DCT process in a unit of macroblock after the process executed by the inverse quantization processing section 12.

The third stage ST3 includes a motion vector prediction processing section 14 and a filter boundary intensity determination processing section 15.

The motion vector prediction processing section 14 executes a motion vector prediction process in a unit of macroblock based on a coefficient obtained by the second stage ST2.

The filter boundary intensity determination processing section 15 determines a filter coefficient (filter boundary intensity value) which is necessary for a deblocking-filter process.

The fourth stage ST4 includes a motion compensated/weighed prediction processing section 16 and an in-screen prediction processing section 17.

The motion compensated/weighed prediction processing section 16 executes a motion compensated/weighed prediction process in a unit of macroblock based on a value determined from a process result of the motion vector prediction processing section 14.

The in-screen prediction processing section 17 executes an in-screen prediction process in a unit of macroblock.

The fifth stage ST5 includes a deblocking-filter processing section 18.

The deblocking-filter processing section 18 executes a deblocking-filter process to the decoded slice processed before the fourth stage ST4 in a unit of macroblock, using the filter boundary intensity value of a deblocking-filter determined by the filter boundary intensity determination processing section 15 of the third stage ST3.

The sixth stage ST6 includes a picture output determination processing section 19 for outputting pictures composed of the slices, which have been decoded, in an order of display.

Figure 2:
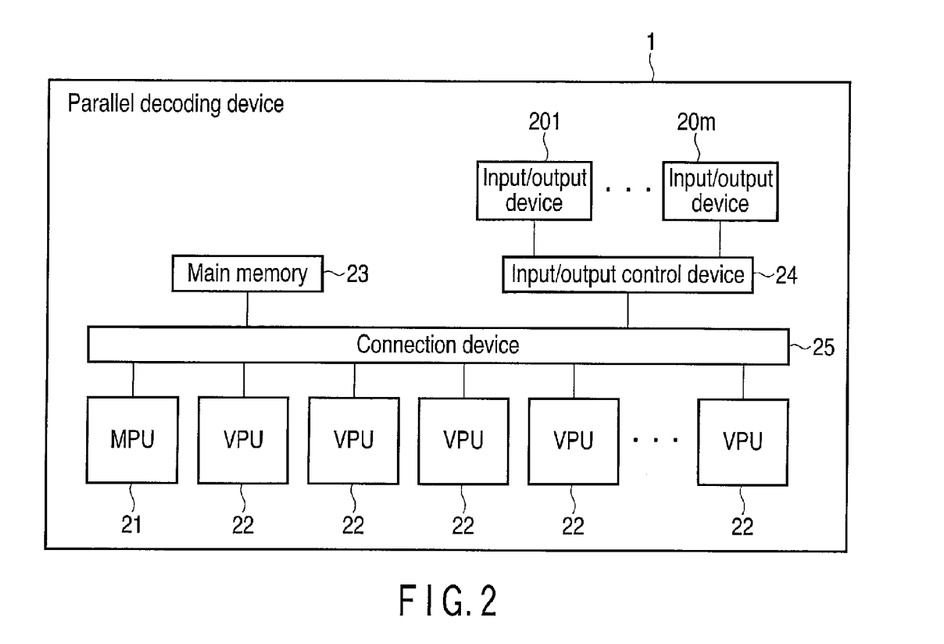
FIG. 2 is a block diagram showing an example of a hardware configuration of the parallel decoding device according to the first embodiment.

FIG. 2 is a block diagram showing an example of a hardware configuration of the parallel decoding device 1 according to the present embodiment.

The parallel decoding device 1 is an information process device or a computing system which operates as a digital moving image process system and further can be used as a general purpose computing machine.

The parallel decoding device 1 includes input/output devices 201-20$m$ of the coded data 5 and the decoded data 8.

The parallel decoding device 1 includes an MPU (Master Processing Unit) 21 and plural VPUs (Versatile Processing Unit) 22 and is configured to be a heterogeneous-multicore device.

In the parallel decoding device 1, the heterogeneous-multicore, a main memory 23, and an input/output control device 24 are interconnected by a connection device 25. Note that the heterogeneous-multicore is a device in which processors having a different architecture are integrated on a single chip.

The MPU 21 is a main processor for controlling an operation of the parallel decoding device 1. An operating system (OS) stored in the main memory 23 and the like is mainly executed by the MPU 21. Further, execution of a part of a function of the OS can be shared by the VPUs 22 or by the input/output devices 201-20$m$. The OS has a function for loading the program 9 to the MPU 21 and to the VPUs 22. The respective VPUs 22 are processors for executing processes under the management of the MPU 21. The MPU 21 executes a control for allocating processes to the VPUs 22 and causes the VPUs 22 to execute the allocated processes in parallel.

The main memory 23 is a storage device shared by the MPU 21, the VPUs 22, and the input/output devices 201-20m.

The input/output devices 201-20m is connected to the input/output control device 24.

Note that the parallel decoding device 1 may employ a homogeneous-multicore configuration which includes plural MPUs 21 and no VPU 22 or includes no MPU 21 and plural VPUs 22. Further, the parallel decoding device 1 may employ a heterogeneous-multicore configuration which includes plural MPUs 21 and plural VPUs 22.

Figure 3:
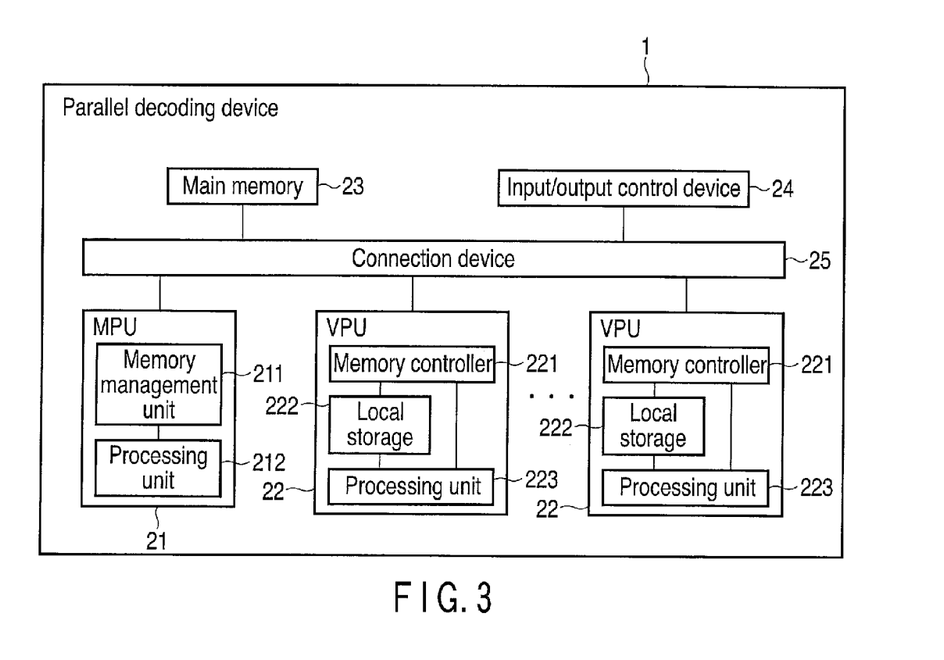
FIG. 3 is a block diagram showing an example of configurations of a MPU and VPUs.

FIG. 3 is a block diagram showing an example of configurations of the MPU 21 and the VPUs 22.

The MPU 21 includes a memory management unit 211 and a processing unit 212.

The memory management unit 211 executes a virtual memory management, an inseparable access management of the main memory 23, and a management of a cache memory in the memory management unit 211.

The processing unit 212 accesses the main memory 23 via the memory management unit 211 and processes the program 9.

Each of the VPUs 22 includes a memory controller 221, a local storage 222, and a processing unit 223.

The memory controller 221 executes the inseparable access management of the main memory 23, controls a direct data transfer (DMA: Direct Memory Access) between the local storages 222 and the main memory 23, and executes the virtual memory management.

The local storages 222 are memories of the processing units 223.

The processing units 223 process programs held by the local storages 222. Further, when the processing units 223 read data, the processing units 223 access the main memory 23 via the memory controllers 221 to read the data and store the read data in the local storages 222. In contrast, when the processing units 223 write data, the processing units 223 access the main memory 23 via the memory controllers 221 and write the data of the local storages 222.

The coded data 5 is data in which continuous pictures (frames) according to the H.264 standard are coded, and one picture includes slices.

Further, each slice includes macroblocks each composed of 16×16 pixels.

Each slice includes a slice header showing slice information.

In the coded data 5, the slice which constitutes the picture is coded together with the slice header. The slice and the slice header are treated as slice data.

In the H.264 standard, a layer for directly coding a slice moving image is called a VCL (Video Coding Layer).

In contrast, in the H.264 standard, a layer such as parameter set (SPS: Sequence Parameter Set and PPS: Picture Parameter Set) or SEI (Supplemental Enhancement Information) and the like, which is different from the VCL, are called non-VCL.

In the H.264 standard, a layer which connects between a low order system layer for transmitting and storing the coded data 5 and the VCL and the non-VCL, is called a NAL (Network Abstraction Layer). Further, in the network abstraction layer, the VCL and the non-VCL are called a VCL NAL and a non-VCL NAL, respectively.

Figure 4:
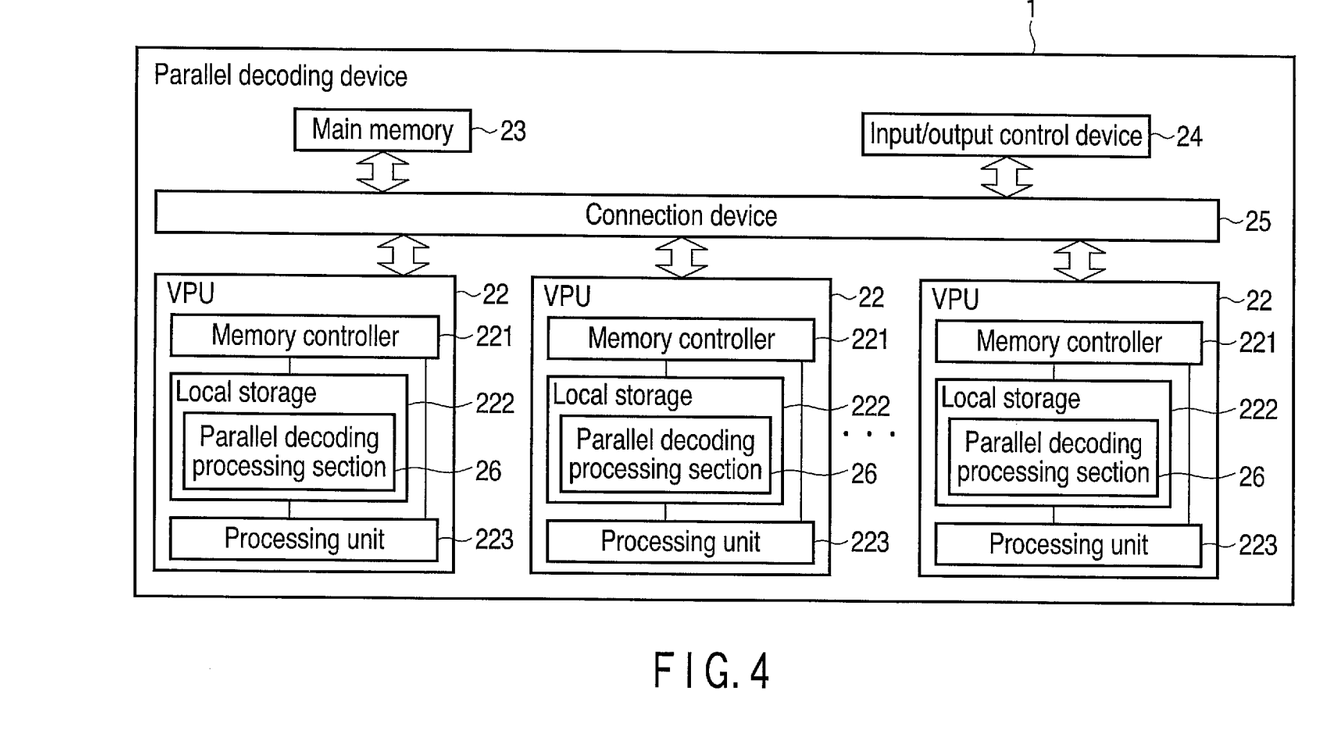
FIG. 4 is a block diagram showing an example of a state in which an H.264 parallel decoding process is executed by a system configuration of the parallel decoding device according to the first embodiment.

FIG. 4 is a block diagram showing an example of a state in which an H.264 parallel decoding process is executed by a system configuration of the parallel decoding device 1 according to the present embodiment.

Parallel decoding processing sections 26 are loaded on the local storages 222 disposed to the VPUs 22, respectively. The parallel decoding processing sections 26 correspond to the stage controller 2 and to the decoding processing section 3, respectively.

Since the parallel decoding processing sections 26 are loaded on the local storages 222 disposed on the VPUs 22, the parallel decoding processing sections 26 are executed by the processing units 223.

The parallel decoding processing sections 26, which are loaded on the local storages 222 of the VPUs 22, execute the decoding process in synchronization by the processing units 223 using the main memory 23, the connection device 25, or both the main memory 23 and the connection device 25.

When an execution capacity of the parallel decoding processing sections 26 is larger than a physical capacity of the local storages 222, the stage controller 2 and the decoding processing section 3 are loaded on the local storages 222 by an overlay, and the parallel decoding processing sections 26 are executed by the processing units 223.

Further, the first stage ST1, the second stage ST2, the third stage ST3, the fourth stage ST4, the fifth stage ST5, and the sixth stage ST6 are loaded on the local storages 222, and the decoding processing section 3 is executed by the processing units 223. In the present embodiment, a configuration of the program 9 where the respective stages ST1-ST6 are loaded on the local storages 222 by an overlay may be applied.

A synchronization using the main memory 23, the connection device 25 or both the main memory 23 and the connection device 25 is executed by an inseparable access to the main memory 23 using the memory controllers 221 or an access method equivalent to the inseparable access.

Further, the synchronization includes also a method of executing a communication between the VPUs 22 using the connection device 25. In the parallel decoding processing sections 26, the synchronization is used in a synchronization process between the stage controller 2 and the first stage ST1, the second stage ST2, the third stage ST3, the fourth stage ST4, the fifth stage ST5, and the sixth stage ST6 which are sections to be controlled of the stage controller 2 and included in the decoding processing section 3.

Operations of the stages ST1-ST6 of the parallel decoding device 1 according to the present embodiment will be explained below.

The first stage ST1 creates an analysis result of the slice header of the VCL NAL unit which is instructed by the stage controller 2 as a process target and an analysis result of the non-VCL NAL unit including a parameter set of the non-VCL NAL unit.

The coded data 5 which is a target to be analyzed is obtained from the input/output control device 24 using the memory controllers 221. Further, the coded data 5 as a target to be analyzed may be transferred from an input/output control device 210 to the main memory 23 and obtained by the processing unit 223 from the main memory 23 using the memory controller 221.

The analysis results of the first stage ST1 are notified to the stage controller 2. The stage controller 2 obtains notified information from the first stage ST1. The first stage ST1 or the stage controller 2 manages the analysis result of the slice header of the VCL NAL unit and the analysis result of the non-VCL NAL unit so that the each slice is related to the analysis results in the control information 6.

The analysis result of the slice header of the VCL NAL unit and the analysis result of the non-VCL NAL unit including the parameter set are stored in a region of the main memory 23 using the memory controllers 221.

The region, in which the analysis result of the slice header of the VCL NAL unit and the analysis result of the non-VCL NAL unit including the parameter set are stored, may be the local storages 222.

The second stage ST2 obtains the analysis result of the slice header of the VCL NAL unit and the analysis result of the non-VCL NAL unit including the parameter set, which correspond to a slice which is instructed by the stage controller 2 as a process target and is analyzed by a first stage ST1.

Further, the coded data 5 of a slice which is a target to be processed by the second stage ST2 is obtained from the input/output control device 24 using the memory controllers 221. Further, the coded data 5 which is a target to be analyzed may be transferred from the input/output control device 210 to the main memory 23 and obtained by the processing units 223 from the main memory 23 using the memory controllers 221.

The second stage ST2 notifies the stage controller 2 of a progress state of a process of each unit of macroblock or macroblocks. The stage controller 2 manages the progress state of the process of each unit of macroblock or macroblocks received from the second stage ST2 by the control information 6. Further, the second stage ST2 also notifies the stage controller 2 of a process result of the second stage ST2.

The stage controller 2 obtains notified information from the second stage ST2. The second stage ST2 or the stage controller 2 manages the process result so that each slice is related to the process result obtained by the second stage ST2 in the control information 6.

The process result by the second stage ST2 is stored in a region of the main memory 23 using the memory controllers 221. Further, the region, in which the process result by the second stage ST2 is stored, may be the local storages 222.

The third stage ST3 obtains the analysis result of the slice header of the VCL NAL unit by the first stage ST1, the analysis result of the non-VCL NAL unit including the parameter set by the first stage ST1, and the process result by the second stage ST2, which correspond to a slice which is instructed by the stage controller 2 as a process target.

While the third stage ST3 processes execution process data to the slice which is instructed by the stage controller 2, the third stage ST3 notifies the stage controller 2 of a progress state of a process of each unit of macroblock or macroblocks. The stage controller 2 manages the progress state of the process of each unit of macroblock or macroblocks received from the third stage ST3 by the control information 6. Further, the third stage ST3 also notifies the stage controller 2 of a process result of the third stage ST3. The stage controller 2 obtains notified information from the third stage ST3. The notified information of a progress state of a process or the notified information of the process result of the third stage ST3 include a value of a motion vector determined during the process of the third stage ST3.

The third stage ST3 or the stage controller 2 manages the process result so that each slice is related to the process result by the third stage ST3 in the control information 6.

The process result by the third stage ST3 is stored in a region of the main memory 23 using the memory controllers 221. Further, the region, in which the process result by the third stage ST3 is stored, may be the local storages 222.

The fourth stage ST4 obtains the analysis result of the slice header of the VCL NAL unit by the first stage ST1, the analysis result of the non-VCL NAL unit including the parameter set by the first stage ST1, and the process result by the second stage ST3, which correspond to a slice which is instructed by the stage controller 2 as a process target.

While the fourth stage ST4 processes execution process data to the slice which is instructed by the stage controller 2, the fourth stage ST4 notifies to the stage controller 2 of a progress state of a process of each unit of macroblock or macroblocks. The stage controller 2 manages the progress state of the process of each unit of macroblock or macroblocks received from the fourth stage ST4 by the control information 6. Further, the fourth stage ST4 also notifies the stage controller 2 of a process result of the fourth stage ST4. A stage controller 2 obtains notified information from the fourth stage ST4. The fourth stage ST4 or the stage controller 2 manages the process result so that each slice is related to the process result by the fourth stage ST4 in the control information 6.

The process result by the fourth stage ST4 is stored in a region of the main memory 23 using the memory controllers 221. Further, the region, in which the process result by the fourth stage ST4 is stored, may be the local storages 222.

The fifth stage ST5 obtains the analysis result of the slice header of the VCL NAL unit by the first stage ST1, the analysis result of the non-VCL NAL unit including the parameter set by the first stage ST1, and the process result by the second stage ST4, which correspond to a slice which is instructed by the stage controller 2 as a process target.

While the fifth stage ST5 processes execution process data to the slice which is instructed by the stage controller 2, the fifth stage ST5 notifies the stage controller 2 of a progress state of a process of each unit of macroblock or macroblocks. The stage controller 2 manages a progress state of a process of each unit of macroblock or macroblocks received from the fifth stage ST5 by the control information 6. Further, the fifth stage ST5 notifies the stage controller 2 of a process result of the fifth stage ST5. The fifth stage ST5 or the stage controller 2 manages a process result so that each slice is related to the process result by the fifth stage ST5 in the control information 6.

The process result by the fifth stage ST5 is stored in a region of the main memory 23 using the memory controllers 221. Further, the region, in which the process result by the fifth stage ST5 is stored, may be the local storages 222.

The sixth stage ST6 executes an output determination process to pictures which are instructed by the stage controller 2 as a process target and outputs the pictures of the decoded data 8 in an order of display.

A control executed by the stage controller 2 will be explained below.

When the stage controller 2 determines whether or not the first stage ST1 can be executed, the stage controller 2 confirms the number of slices of the VCL NAL unit in which a process of the first stage ST1 has been finished as well as a process of the second stage ST2 is not executed. Then, the stage controller 2 instructs the first stage ST1 to execute the process of the first stage ST1 so that a slice in which the process of the first stage ST1 has been finished as well as the process of the second stage ST2 is not executed is not depleted (so that the slice does not become short or the number of the slices becomes equal to or less than a predetermined number).

When the stage controller 2 determines whether or not the second stage ST2 can be executed, the stage controller 2 confirms that at least one slice has been processed by the first stage ST1 as well as confirms whether or not there is a slice, to which all the parameter set of the non-VCL NAL unit necessary to process a process target slice of the second stage ST2 have been analyzed. As a result of confirmation, the stage controller 2 selects one slice or slices from slices which are determined to be in a ready (executable) state (the slices which have been processed by the first stage ST1 as well as in which a necessary analysis of the non-VCL NAL has been finished) as execution target data, and instructs one or plural VPUs 22 to process the execution target data.

In a first determination in which the stage controller 2 determines whether or not the third stage ST3 can be executed, the stage controller 2 confirms the number of slices which have been processed or are being processed by the second stage ST2 as well as which are not processed by the third stage ST3. Then, the stage controller 110 instructs the third stage ST3 to execute a process of the third stage ST3 so that a slice, which has been processed by the second stage ST2 as well as are not processed by the third stage ST3, is not depleted.

In a second determination in which the stage controller 2 determines whether or not the third stage ST3 can be executed, the stage controller 2 confirms a process state of the second stage ST2 which is information notified to the stage controller 2 as to a slice which has been processed or is being processed by the second stage ST2. In that case, the stage controller 2 determines that the third stage ST3 can be executed to the slice confirmed by the stage controller 2 and instructs the third stage ST3 to process the slice in an event "where there is a macroblock which has been processed by the second stage ST2, and the macroblock is an intra-macroblock" or "where, in a case that the macroblock which is a target to be processed by the second stage ST2 is an inter-macroblock, information, which is determined from a process result by the third stage ST3 of a reference destination macroblock which is used when the inter-macroblock is processed by the third stage ST3, is necessary, and the reference destination macroblock has been processed by the third stage". Execution process data of the stage controller 2 in the case is a part or all of macroblocks to which it is determined by the stage controller 2 that the third stage ST3 can be executed. The stage controller 2 determines that a process, which is executed to a slice whose disable_deblocking_filter_idc is 1 in slice header information by the filter boundary intensity determination processing section 15 of the third stage ST3, is not necessary.

When the stage controller 2 determines whether or not the fourth stage ST4 can be executed, the stage controller 2 confirms whether or not there is a slice which has been processed or is being processed by the third stage ST3. Further, when the stage controller 2 determines whether or not the fourth stage ST4 can be executed, the stage controller 2 confirms a process state of the third stage ST3 which is information notified to the stage controller 2 as to a slice which has been processed or is being processed by the third stage ST3. In that case, the stage controller 2 determines that the fourth stage ST4 can be executed to a slice confirmed by the stage controller 2 and instructs the fourth stage ST4 to process a slice in an event "where, in a case that a macroblock which is a target to be determined by the fourth stage ST4 is an intra-macroblock, there is a macroblock in which the inter-macroblock has been processed by the second stage ST2 and there is an intra-macroblock which has been processed or need not be processed by the fourth stage ST4 to a nearby macroblock which is used when the intra-macroblock is processed by the fourth stage ST4", or "where, in a case that the macroblock which is a target to be determined by the fourth stage ST4 is an inter-macroblock, there is the inter-macroblock which has been processed by the second stage ST2 and the third stage ST3, which has been processed by the motion vector prediction processing section 14 of the third stage ST3, and which has been processed or need not be processed by the deblocking-filter processing section 18 of the fifth stage ST5 to a reference destination macroblock which is determined by the process result of the motion vector prediction processing section 14 of the third stage ST3". It is assumed that execution process data of the stage controller 2 in the case is a part or all of the macroblocks which are determined to be in a ready state by the stage controller 2.

When the stage controller 2 determines whether or not the fifth stage ST5 can be executed, the stage controller 2 confirms whether or not there is a slice which has been processed or is being processed by the fourth stage ST4. Further, when the stage controller 2 determines whether or not the fifth stage ST5 can be executed, the stage controller 2 confirms a process state of the third stage ST3 which is information notified to the stage controller 2 as to a slice which has been processed or is being processed by the third stage ST3 and a process state of the fourth stage ST4 which is information notified to the stage controller 2 as to a slice which has been processed or is being processed by the fourth stage ST4. In that case, the stage controller 2 determines that the fifth stage ST5 can be executed to a slice which is confirmed by the stage controller 2 and instructs the fifth stage ST5 to process the slice in an event "where, in a case that a macroblock which is a target to be determined by the fifth stage ST5 is an intra-macroblock, there is the intra-macroblock which has been processed by the filter boundary intensity determination processing section 15 of the third stage ST3 and which has been processed by the in-screen prediction processing section 17 of the fourth stage ST4" or "where, in a case that the macroblock which is a target to be determined by the fifth stage ST5 is an inter-macroblock, there is the intra-macroblock which has been processed by the filter boundary intensity determination processing section 15 of the third stage ST3 and which has been processed by the motion compensated/weighed prediction processing section 16 of the fourth stage ST4" as well as "where there is the intra-macroblock or the inter-macroblock in which a value of the deblocking-filter descriptor (disable_deblocking_filter_idc) of slice header information corresponding to a slice including the intra-macroblock or the inter-macroblock is not 1, in which there is a macroblock which is referred to when the intra-macroblock or the inter-macroblock is processed by the fifth stage ST5, and in which the fifth stage ST5 to the macroblock to be referred has been finished". It is assumed that execution process data of the stage controller 2 in the case is a part or all of macroblocks which are determined to be in a ready state by the stage controller 2. The stage controller 2 determines that a slice, in which the disable_deblocking_filter_idc in slice header information is 1, need not be processed by the fifth stage ST5.

As to the sixth stage ST6, the stage controller 2 determines that a picture, in which a terminal end slice belongs to a part or all of a configuration slice, can be output in an event "where all the stages up to the fourth stage ST4 have been finished to a slice in which the disable_deblocking_filter_idc in slice header information of a slice which is a target to be determined is 1" or "where all the stages up to the fifth stage ST5 have been finished to a slice in which the disable_deblocking_filter_idc in slice header information of a slice which is a target to be determined is not 1" as well as "where the slice which is a target to be determined is the terminal end slice of slices which constitute a picture". In that case, the stage controller 2 instructs the sixth stage ST6 to process the picture.

In the embodiment explained above, when the coded data 5 is decoded on the parallel decoding device 1 including the processors, determination for executing the decoding process in parallel in a unit of slice or determination for executing pipeline process in a unit of macroblock are dynamically made. With the operation, even if the dependence relations are established between data and between processes as in the decoding according to the H.264 standard, since the decoding processes can be executed in parallel on the parallel decoding device 1 including the processors, processor resources can be efficiently used.

Note that although the decoding to which the H.264 standard is applied is explained in the present embodiment, even when coded data, which are coded by other system, are decoded in parallel, a device for executing decoding in parallel based on the same view point can be realized.

Second Embodiment

In a second embodiment, process layers of a program (tool) 6 of the parallel decoding device 1 according to the first embodiment is explained.

Figure 5A:
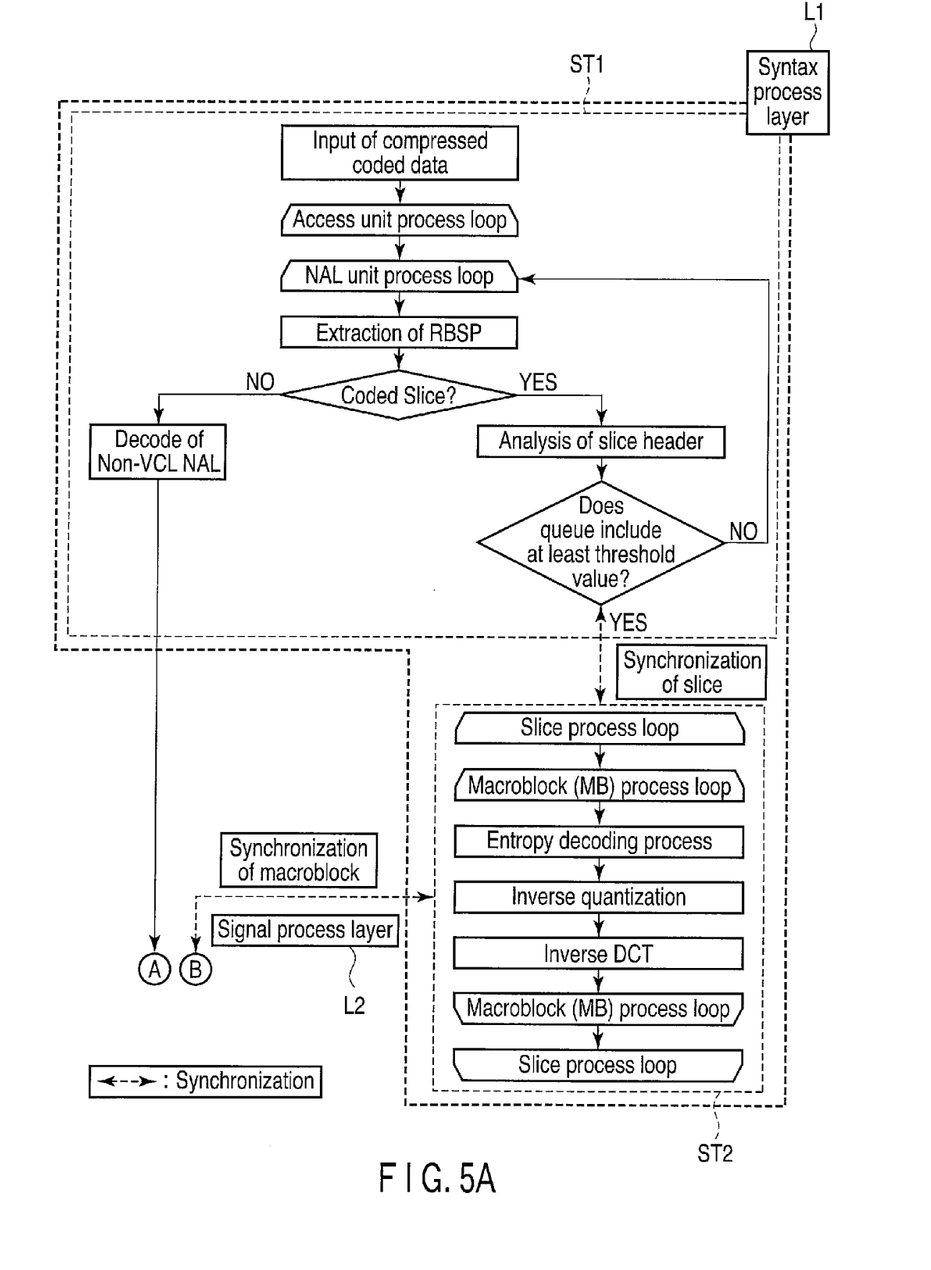
FIG. 5A is a flowchart showing an example of a relation between stages ST1-ST2 and process layers in a program of a parallel decoding device according to a second embodiment.

FIG. 5A is a flowchart showing an example of a relation between stages ST1-ST2 and process layers in the program 6 of a parallel decoding device according to the present embodiment.

Figure 5B:
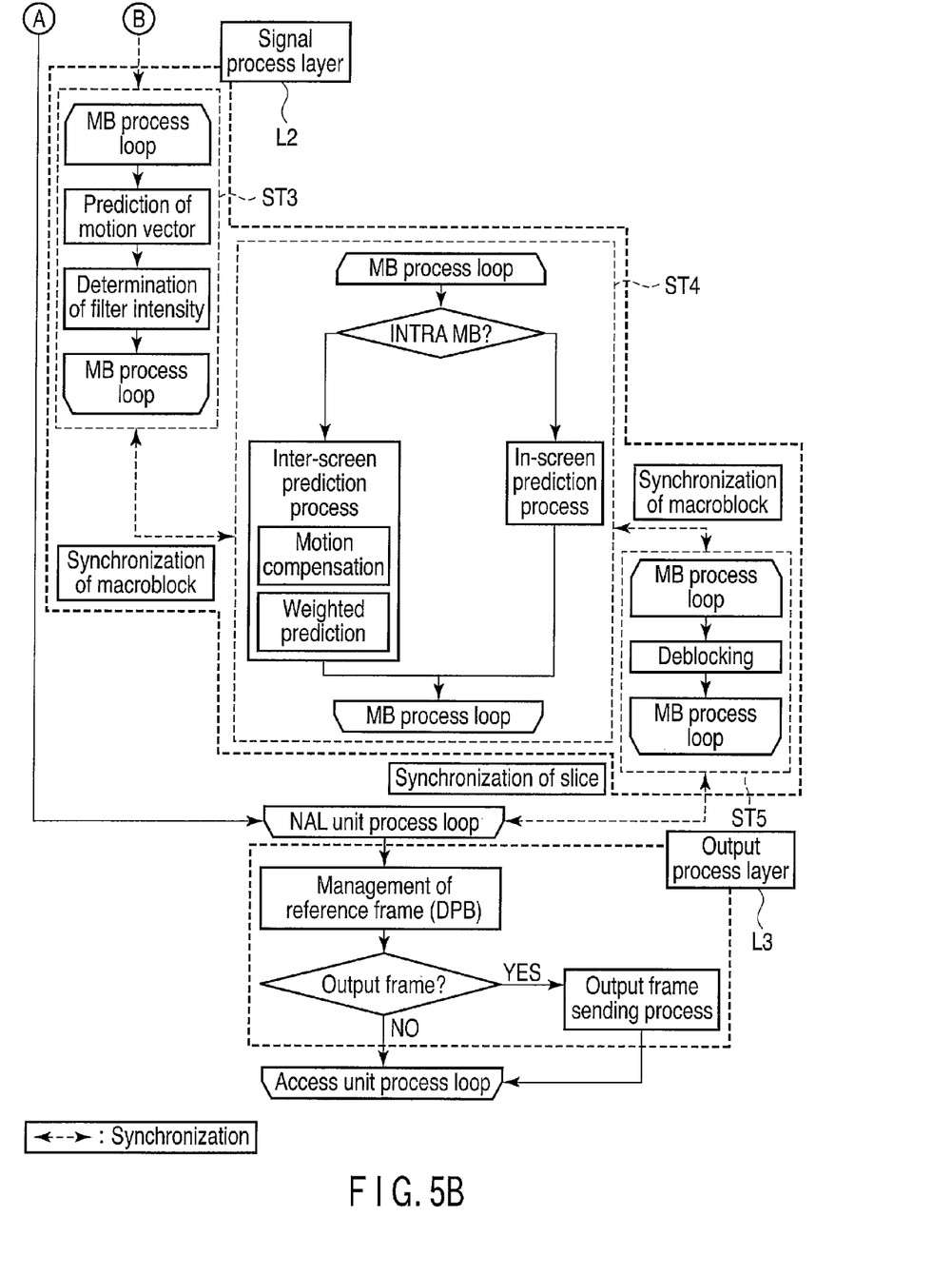
FIG. 5B is a flowchart showing an example of a relation between stages ST3-ST6 and process layers in the program of the parallel decoding device according to the second embodiment.

FIG. 5B is a flowchart showing an example of a relation between stages ST3-ST6 and process layers in the program 6 of the parallel decoding device according to the present embodiment.

A syntax process layer L1 includes the first stage ST1 and the second stage ST2.

The first stage ST1 is a module for executing an analysis process of various parameters of the non-VCL NAL unit and a slice header of the VCL NAL unit.

The second stage ST2 is a module for executing an entropy decoding process, an inverted quantization process, and an inverted DCT process after the analysis process for the slice header of the VCL NAL unit.

A signal process layer L2 includes the third stage ST3, the fourth stage ST4, and the fifth stage ST5.

The third stage ST3 is a module for executing a motion vector prediction process and a deblocking-filter boundary intensity determination process.

The fourth stage ST4 is a module for executing an in-screen prediction process and an inter-screen prediction process other than the motion vector prediction process.

The fifth stage ST5 is a module for executing a deblocking-filter process excluding a filtering intensity determination process.

An output process layer L3 includes the sixth stage ST6.

Figure 6:
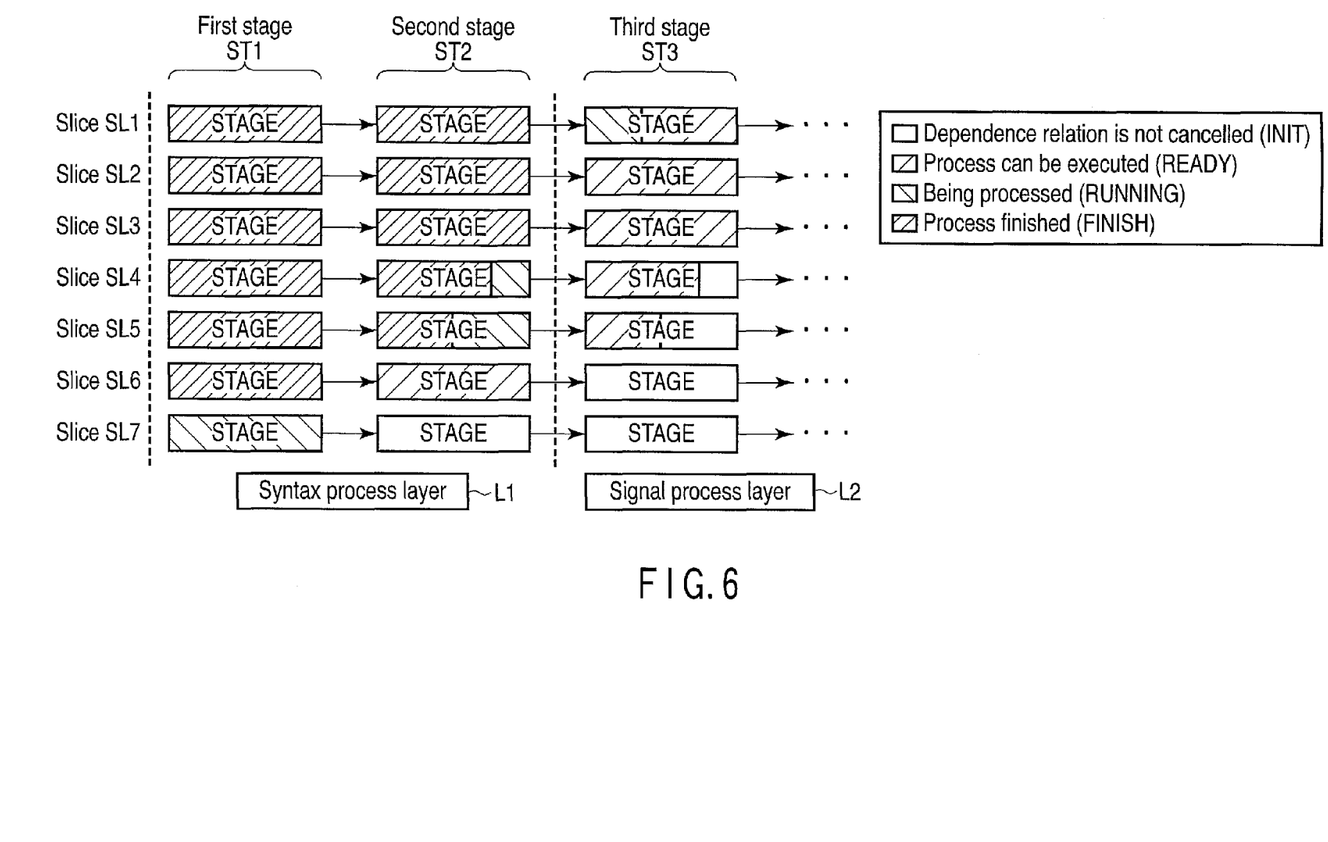
FIG. 6 is a block diagram showing an example of a progress state of a parallel process of a syntax process layer.

FIG. 6 is a block diagram showing an example of a progress state of a parallel process of the syntax process layer L1.

In the present embodiment, the first stage ST1 executes a series process.

The first stage ST1 has a feature for storing process results (for example, SPS, PPS, and the slice header). The feature allows the second stage ST2 to execute a parallel process. Note that information of the SPS, the PPS, and the slice header are used by the stages ST1-ST6.

The second stage ST2 can execute the parallel process in a unit of each of slices SL1-SL7 and is synchronized with the first stage ST1 in a unit of slice.

The second stage ST2 is synchronized with the third stage ST3 in a unit of macroblock. The synchronization allows a pipeline process from the second stage ST2 to the third stage ST3.

Figure 7:
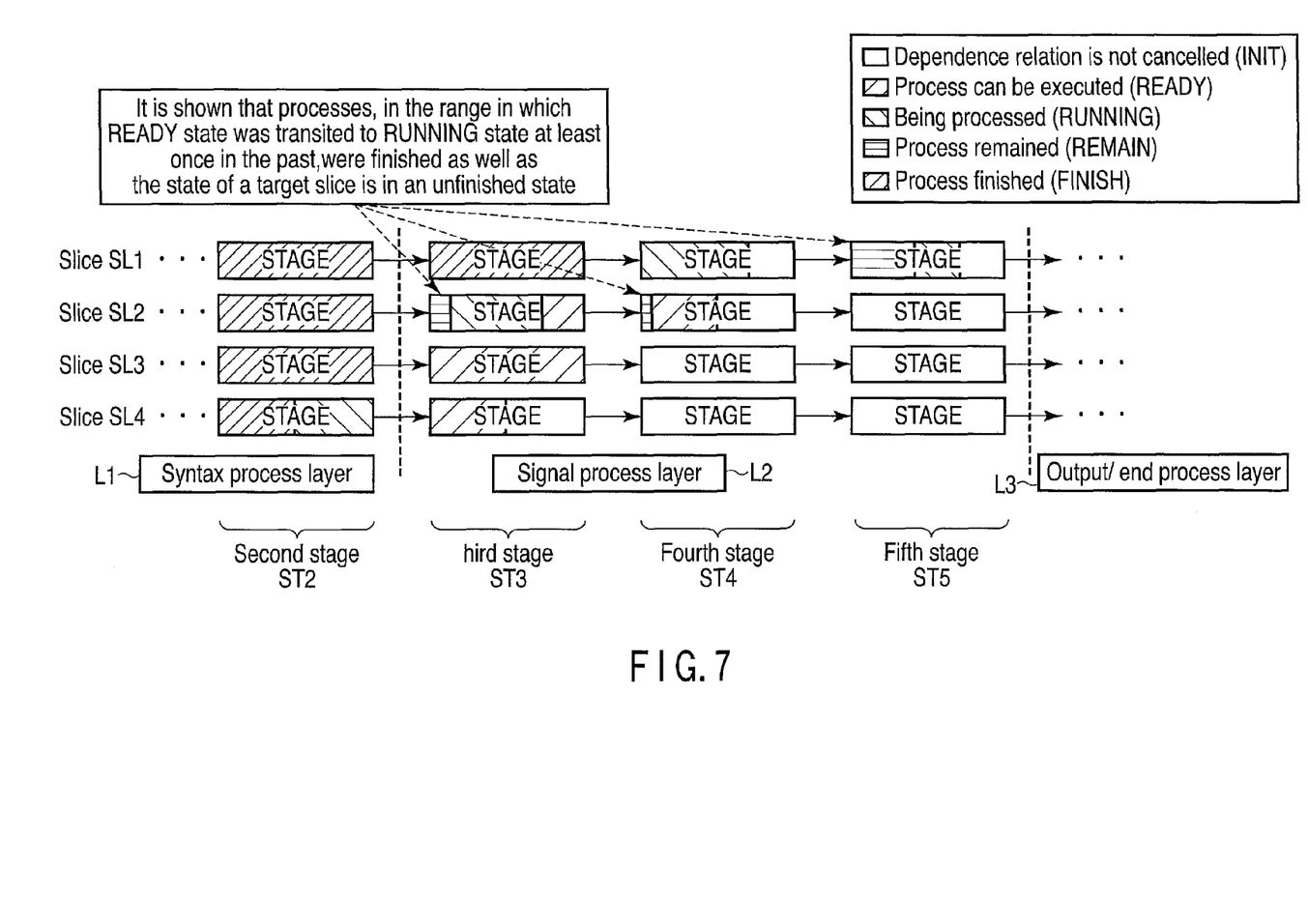
FIG. 7 is block diagram showing an example of a progress state of a parallel process of a signal process layer.

FIG. 7 is block diagram showing an example of a progress state of the parallel process (pipeline process) of the signal process layer L2.

In the present embodiment, the pipeline process can be executed from the second stage ST2 to the third stage ST3.

The third stage ST3 can execute the parallel process in consideration of the dependence relation in the third stage ST3 in each type of the slices SL1-SL7 or in each type of the macroblocks constituting the respective slices.

The third stage ST3 is synchronized with the fourth stage ST4 in a unit of macroblock. The synchronization allows the pipeline process from the third stage ST3 to the fourth stage ST4. Note that, for example, the third stage ST3 notifies the fourth stage ST4 of a maximum value of a motion vector to a lower direction of Y in a unit of macroblock line. A motion vector value is used in the inter-screen prediction process in the fourth stage ST4. The motion vector value need not necessarily be notified in a unit of macroblock line. In a program configuration in which a management is executed by the stage controller 2 in a unit of macroblock, it is necessary for the motion vector value to be notified in a unit of macroblock. Since a motion vector prediction value of a macroblock which is subjected to the in-screen prediction process does not originally exist, the motion vector prediction value is not notified.

The fourth stage ST4 can execute the parallel process in consideration of the dependence relation between the third stage ST3 and the fifth stage ST5 in each type of the slices SL1-SL7 or in each type of the macroblocks constituting the respective slices.

The fourth stage ST4 is synchronized with the fifth stage ST5 in a unit of macroblock. The synchronization allows the pipeline process from the fourth stage ST4 to the fifth stage ST5.

The fifth stage ST5 is synchronized with the sixth stage ST6 in a unit of slice.

In the present embodiment, since decoding to the H.264 coded data 5 can be executed in parallel, the resources (for example, the local storages 222, the memory controllers 221) of the parallel decoding device 1 having a multi-processor structure can be efficiently used.

In the present embodiment, the programs 9 can be processed in parallel and the pipeline process can be executed between the programs 9.

In the respective embodiments, the respective components of the parallel decoding device 1 can be optionally combined or divided. For example, one stage controller may control the plural decoding processing sections 3. A multi-process/multi-thread configuration may be applied to the parallel decoding device 1 according to the respective embodiments. As described above, in the respective embodiments, what stages the decoding process are divided into and what processes are allocated to any of the stages can be appropriately changed depending on the feature of an architecture and on the configuration of a chip.

In a first modified example of a relation between the stages and the processes included in the decoding process, the syntax analysis is included in the first stage. The entropy decoding process is included in the second stage. The inverted quantization process, the inverted DCT process, and the motion vector prediction process are included in the third stage. The motion compensated/weighed prediction process and the in-screen prediction process are included in the fourth stage. The filter boundary intensity determination process and the deblocking-filter process are included in the fifth stage. The output determination process is included in the sixth stage.

In a second modified example of the relation between the stages and the processes, the syntax analysis is included in the first stage. The entropy decoding process and the inverted quantization process are included in the second stage. The inverted DCT process, the motion vector prediction process, and the filter boundary intensity determination process are included in the third stage. The motion compensated/weighed prediction process and the in-screen prediction process are included in the fourth stage. The deblocking-filter process is included in the fifth stage. The output determination process is included in the sixth stage.

In a third modified example of the relation between the stages and the processes, the syntax analysis is included in the first stage. The entropy decoding process, the inverted quantization process, and the inverted DCT process are included in the second stage. The motion vector prediction process and the filter boundary intensity determination process are included in the third stage. The motion compensated/weighed prediction process and the in-screen prediction process are included in the fourth stage. The deblocking-filter process is included in the fifth stage. The output determination process is included in the sixth stage.

In a fourth modified example of the relation between the stages and the processes, the syntax analysis is included in the first stage. The entropy decoding process, the inverted quantization process, and the inverted DCT process are included in the second stage. The motion vector prediction process is included in the third stage. The motion compensated/weighed prediction process and the in-screen prediction process are included in the fourth stage. The filter boundary intensity determination process and the deblocking-filter process are included in the fifth stage. The output determination process is included in the sixth stage.

In the first to fourth modified examples, the first stage executes processes in series. The second stage can parallelly execute processes in a unit of slice. The second stage is synchronized with the first stage in a unit of slice and the third stage in a unit of macroblock. The third stage is synchronized with the fourth stage in a unit of macroblock. The fourth stage is synchronized with the fifth stage in a unit of macroblock. The fifth stage is synchronized with the sixth stage in a unit of slice.

In the respective embodiments, a unit of synchronization between the stages is a unit of macroblock, macroblocks, or slice. In this case, for example, the maximum number of macroblocks included in a unit of synchronization is the maximum number of macroblocks included within a slice.

In the respective embodiments, it is sufficient that the parallel decoding device 1 includes at least one processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A decoding device comprising:
a storage section which stores control information, the control information showing a progress state of process stages for a decoding process as to a plurality of processing data included in coded data;
a control section which allocates process stages corresponding to executable processing data which is executable in parallel, to at least one processor on the basis of the control information, a dependence relation between the processing data in the decoding process, and a dependence relation between the process stages; and
a decoding processing section which parallelly executes allocated process stages corresponding to the executable processing data, wherein:
the decoding processing section comprises a syntax analysis, an entropy decoding process, an inverted quantization process, an inverted DCT process, a motion vector prediction process, a filter boundary intensity determination process, a motion compensated/weighed prediction process, an in-screen prediction process, a deblocking-filter process, and an output determination process;
the syntax analysis is included in a first stage;
the entropy decoding process is included in a second stage;
the inverted quantization process is included in the second stage or a third stage;
the inverted DCT process is included in the second stage or the third stage;
the motion vector prediction process is included in the third stage;
the filter boundary intensity determination process is included in the third stage or a fifth stage;
the motion compensated/weighed prediction process and the in-screen prediction process are included in a fourth stage;
the deblocking-filter process is included in the fifth stage;
the output determination process is included in a sixth stage;
the first stage executes processes in series;
the second stage can parallelly execute in a unit of slice, the second stage being synchronized with the first stage in a unit of slice and the third stage in a unit of macroblock;
the third stage is synchronized with the fourth stage in a unit of macroblock;
the fourth stage is synchronized with the fifth stage in a unit of macroblock; and
the fifth stage is synchronized with the sixth stage in a unit of slice.

2. The decoding device according to claim 1, wherein:
the coded data comprises a plurality of slices;
each of the slices comprises macroblocks, respectively; and
the control information manages a progress state of processes in a unit of macroblock or in a unit of macroblocks.

3. The decoding device according to claim 1, wherein:
the inverted quantization process and the inverted DCT process are included in the second stage; and
the filter boundary intensity determination process is included in the third stage.

4. The decoding device according to claim 1, wherein:
the inverted quantization process and the inverted DCT process are included in the third stage; and
the filter boundary intensity determination process is included in the fifth stage.

5. The decoding device according to claim 1, wherein:
the inverted quantization process is included in the second stage; and
the inverted DCT process and the filter boundary intensity determination process are included in the third stage.

6. The decoding device according to claim 1, wherein:
the inverted quantization process and the inverted DCT process are included in the second stage; and
the filter boundary intensity determination process is included in the fifth stage.

7. The decoding device according to claim 2, wherein:
a pipeline process from the second stage to the third state, a pipeline process from the third stage to the fourth stage, and a pipeline process from the fourth stage to the fifth stage are executed.

8. A decoding device comprising:
  a storage section which stores control information, the control information showing a progress state of process stages for a decoding process as to a plurality of processing data included in coded data;
  a control section which allocates process stages corresponding to executable processing data which is executable in parallel, to at least one processor on the basis of the control information, a dependence relation between the processing data in the decoding process, and a dependence relation between the process stages; and
  a decoding processing section which parallelly executes allocated process stages corresponding to the executable processing data,
  wherein:
  the coded data is H.264 coded moving image data;
  the decoding process is a decoding process in compliance with an H.264 standard;
  the process stages comprises a second stage for executing an entropy decoding process of a CABAC (Context-based Adaptive Binary Arithmetic Code) or a CAVLC (Context-based Adaptive Variable Length Code) in a unit of macroblock and a third stage for executing a motion vector prediction process in a unit of macroblock;
  the control section determines that the third stage is executable if "in a case that a process target macroblock by the third stage is an inter-macroblock, information which is determined from a process result of the third stage to a reference macroblock is necessary, and processing by the third stage for the reference macroblock is completed", the reference macroblock being used when the inter-macroblock is processed by the third stage, and
  the control section determines that a part or all of the macroblocks which are determined executable by the third stage, are executable data by the third stage.

9. A decoding device comprising:
  a storage section which stores control information, the control information showing a progress state of process stages for a decoding process as to a plurality of processing data included in coded data;
  a control section which allocates process stages corresponding to executable processing data which is executable in parallel, to at least one processor on the basis of the control information, a dependence relation between the processing data in the decoding process, and a dependence relation between the process stages; and
  a decoding processing section which parallelly executes allocated process stages corresponding to the executable processing data,
  wherein:
  the coded data is H.264 coded moving image data;
  the decoding process is a decoding process in compliance with an H.264 standard;
  the process stages comprises a second stage for executing an inverted DCT (Discrete Cosine Transform) process in a unit of macroblock, a third stage for executing a motion vector prediction process in a unit of macroblock, a fourth stage for executing an in-screen prediction process or a motion compensated/weighed prediction process in a unit of macroblock, and a fifth stage for executing a deblocking-filter process;
  the control section determines that the fourth stage is executable if "in a case that a process target macroblock by the fourth stage is an intra-macroblock, there is a macroblock in which processing by the second stage for the intra-macroblock is completed and there is an intra-macroblock in which processing by the fourth stage for a nearby macroblock is completed or need not", or "in a case that the process target macroblock by the fourth stage is an inter-macroblock, there is the inter-macroblock in which processing by the second stage and the third stage for the inter-macroblock is completed and in which a deblocking-filter processing of the fifth stage for a reference macroblock is completed or need not", the nearby macroblock being used when the intra-macroblock is processed by the fourth stage, the reference macroblock being determined by a process result of the third stage; and
  the control section determines that a part or all of the macroblocks which are determined executable by the fourth stage, are executable data by the fourth stage.

* * * * *